(12) United States Patent
Wang

(10) Patent No.: US 6,739,474 B1
(45) Date of Patent: May 25, 2004

(54) GARBAGE CAN FOR USE IN AN AUTOMOBILE

(76) Inventor: Wen-Chang Wang, No. 79, Lane 766, Sec. 1, Jungjeng Rd., Rende Shiang, Tainan (TW)

( * ) Notice: Subject to any disclaimer, the term of this patent is extended or adjusted under 35 U.S.C. 154(b) by 0 days.

(21) Appl. No.: 10/420,797

(22) Filed: Apr. 23, 2003

(51) Int. Cl.[7] .............................................. B65D 43/24
(52) U.S. Cl. ....................... 220/831; 220/810; 220/263
(58) Field of Search ................................ 220/831–833, 220/810, 824, 151, 844, 845, 843, 847, 848, 840–842, 262–265, FOR 193–201; 16/332, 335, 336, 900, 363, 374, 375, 235, 239, 295, 292, 300, 317, 119; 324/275, 401

(56) References Cited

U.S. PATENT DOCUMENTS

| | | | | |
|---|---|---|---|---|
| 2,764,200 A | * | 9/1956 | Gits ......................... 220/254.3 |
| 4,239,093 A | * | 12/1980 | Eubanks et al. ............ 190/106 |
| 4,887,747 A | * | 12/1989 | Ostrowsky et al. ......... 222/556 |
| 4,953,740 A | * | 9/1990 | Koda ......................... 220/263 |
| 5,346,099 A | * | 9/1994 | Salmon et al. ......... 222/153.06 |
| 5,358,135 A | * | 10/1994 | Robbins et al. ............. 220/834 |
| 5,383,560 A | * | 1/1995 | Gueret ....................... 206/581 |
| 6,123,401 A | * | 9/2000 | Chiba et al. ................ 312/328 |
| 6,263,543 B1 | * | 7/2001 | Daoud ......................... 16/342 |
| 6,538,571 B1 | * | 3/2003 | Huang ..................... 340/568.1 |

* cited by examiner

Primary Examiner—Lien Ngo
(74) Attorney, Agent, or Firm—Rosenberg, Klein & Lee

(57) ABSTRACT

A garbage can for use in an automobile includes a container, and a lid; the container has two apart opposing projections on a top; each connecting projection has a pivotal hole extending horizontally from an inward end towards other end, a stopping convexity on the inward end, and front and rear locating concavities respectively adjacent to front and rear edges of the stopping convexity; the lid has two flexible and resilient connecting rods joined to a rear edge; the connecting rods are inserted into the pivotal holes for pivoting the lid to the container, and engage the front concavities when the lid is closed, and engage the rear concavities when the lid is moved to an upright position. An adjustable fastening plate is pivoted to the container, and inserted into narrow rooms between two adjacent parts inside a car for securing the garbage can in position.

2 Claims, 9 Drawing Sheets

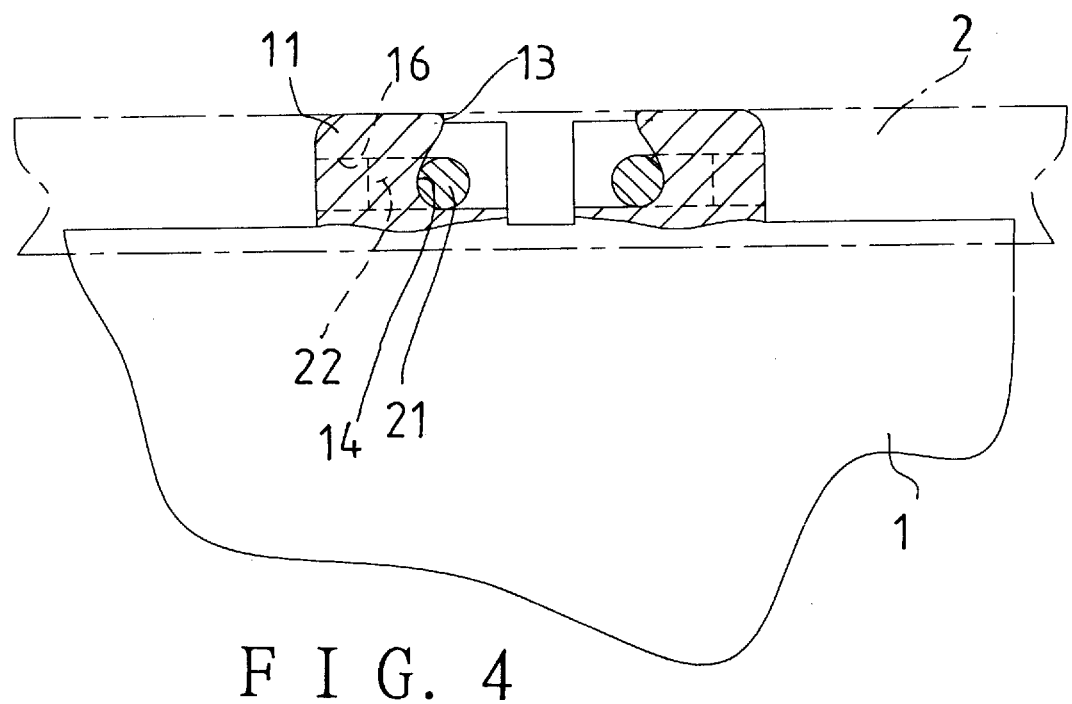
F I G. 4
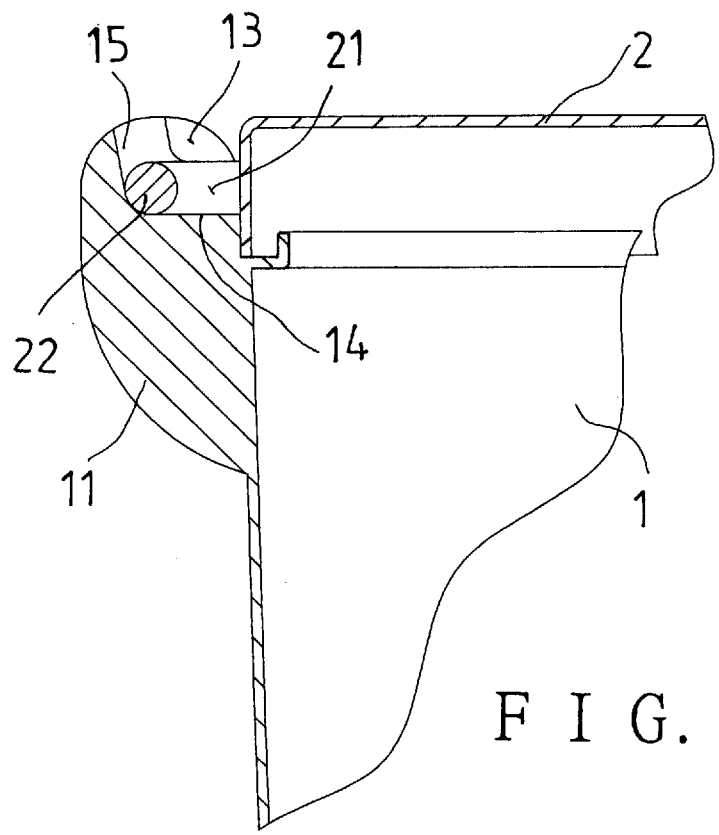
F I G. 5

GARBAGE CAN FOR USE IN AN AUTOMOBILE

BACKGROUND OF THE INVENTION

1. Field of the Invention

The present invention relates to a garbage can, and more particularly, a garbage can, which can be easily secured in position in an automobile for use.

2. Brief Description of the Prior Art

There is usually a small garbage can disposed inside an automobile so that garbage can be put in the can for keeping inside of the automobile clean. However, a garbage can in a car is prone to fall over due to movement of the car if it is not secured in position, causing the users inconvenience.

SUMMARY OF THE INVENTION

It is an object of the present invention to provide a garbage can, which can be easily secured in position in an automobile.

The garbage can includes a containing body, a lid, and a fastening plate; the containing body has a connecting projection on a lateral side, and the fastening plate has a circular member joined thereto, and is pivoted to the connecting projection with the circular member being fitted around the projection; the circular member has an engaging block on an inner side thereof, which separably engages concavely curved sections spaced around an outer side of the projection. The fastening plate is inserted into narrow rooms between two adjacent parts inside a car for securing the garbage can in position.

BRIEF DESCRIPTION OF THE DRAWINGS

The present invention will be better understood by referring to the accompanying drawings, wherein:

FIG. 4 is a partial vertical cross-sectional view of the garbage can according to the present invention, FIG. 5 is another partial vertical cross-sectional view of the garbage can according to the present invention.

DETAILED DESCRIPTION OF THE PREFERRED EMBODIMENTS

Figure 1:
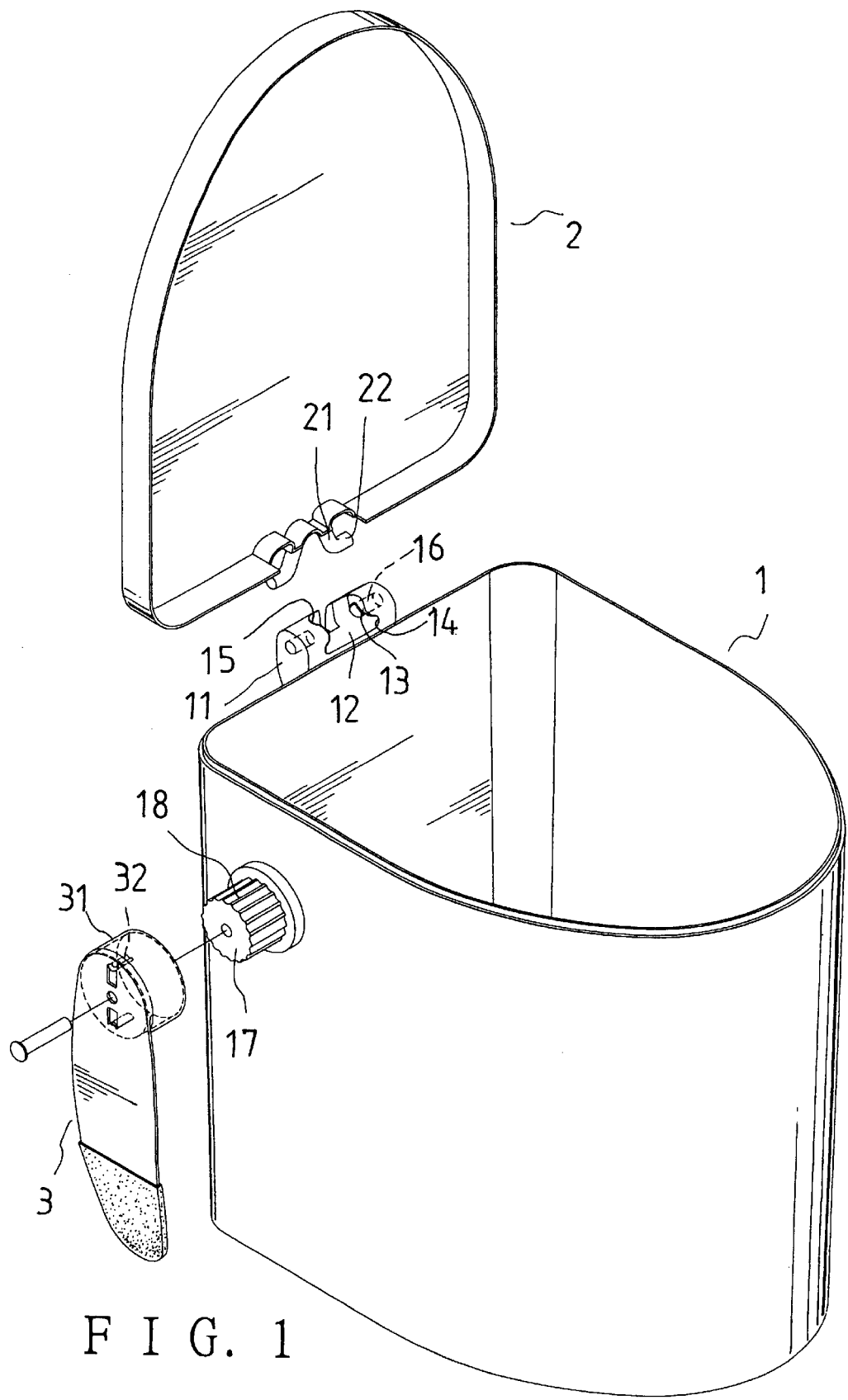
FIG. 1 is an exploded perspective view of the garbage can according to the present invention.

Referring to FIGS. 1 to 5, a preferred embodiment of a garbage can in the present invention includes a containing body 1, a lid 2, and a fastening plate 3.

The containing body 1 has an opening at a top, and a connecting portion 11 formed on a rear side of the top; the connecting portion 11 includes two apart connecting projections opposing each other at inward ends, and a gap 12 between the projections; each of the connecting projections has a pivotal hole 16 extending horizontally from the inward end towards the other end, a stopping convexity 13 on the inward end, a front locating concavity 14 adjacent to a front edge of the stopping convexity 13, and a rear locating concavity 15 adjacent to a rear edge of the stopping convexity 13. In addition, a connecting projection 17 is fixedly disposed on a lateral side of the containing body 1; the connecting projection 17 is formed with concavely curved sections 18 of equal size, parallel to an axis thereof and spaced out on an annular side thereof.

Two flexible and resilient connecting rods 21 are joined to a rear edge of the lid 2; the connecting rods 21 are positioned so as to be substantially parallel to the lid 2, and form an angle between front sections thereof; each of the connecting rods 21 has a horizontal rear section 22 extending from the rear end of the front section.

The fastening plate 3 has a first end, and a second end having a circular member 31 joined thereto; a convexly curved engaging block 32 is formed on an inner side of the circular member 31.

In combination, the lid 2 is pivoted to the connecting portion 11 of the containing body 1 by means of inserting the rear sections 22 of the connecting rods 21 into corresponding ones of the pivotal holes 16. The circular member 31 of the fastening plate 3 is positioned around the connecting projection 17 with the engaging block 32 separably engaging the concavely curved sections 18, and a pivotal pin (not numbered) is used to join the circular member 31 to the connecting projection 17 so that the fastening plate 3 can be adjusted in orientation relative to the connecting projection 17.

Figure 6:
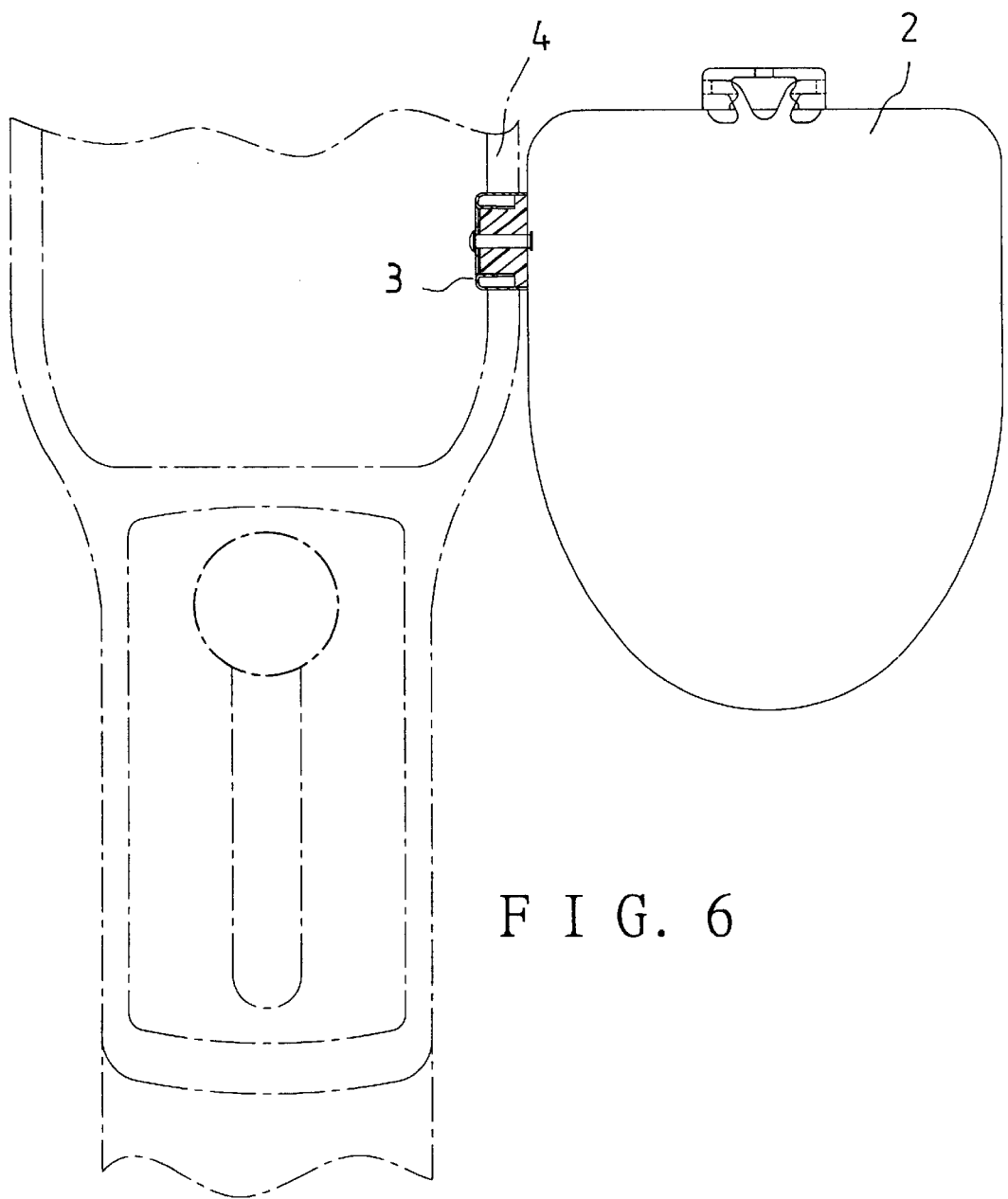
FIG. 6 is a top view of the present garbage can, secured in a car.
Figure 7:
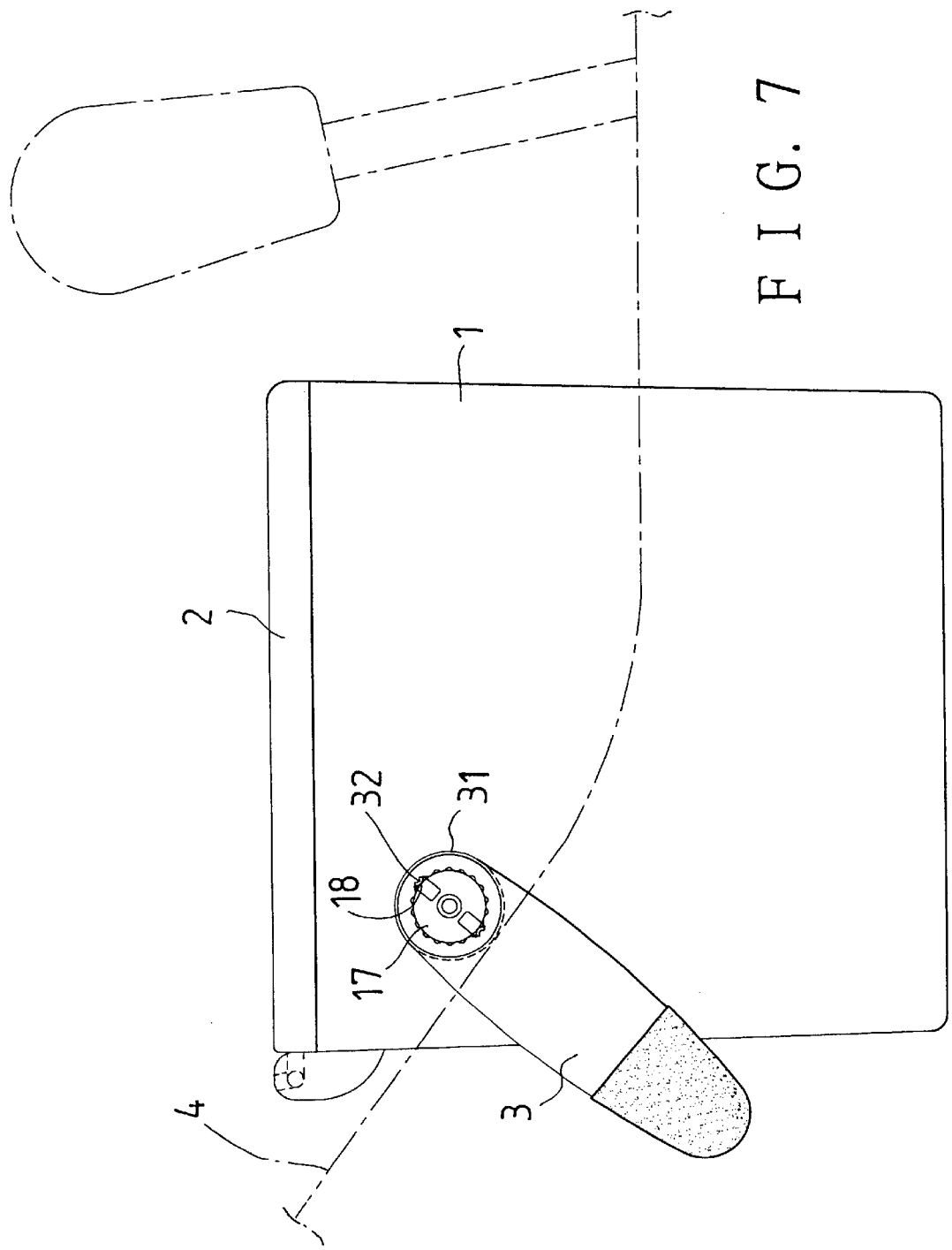
FIG. 7 is a side view of the present garbage can, secured in a car with the fastening plate adjusted to a sloping position.
Figure 8:
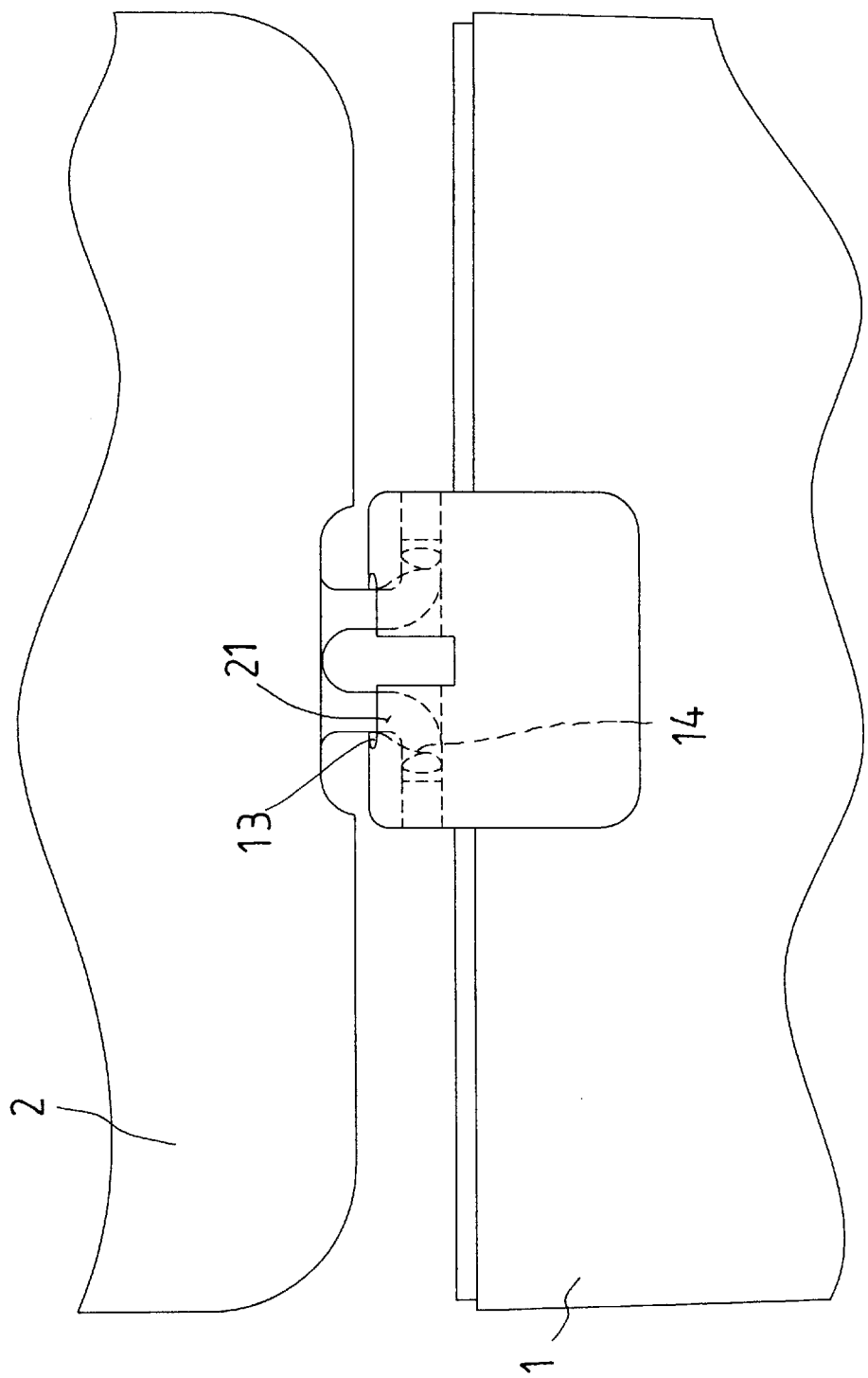
FIG. 8 is a partial view of the present garbage can, in opened position.
Figure 9:
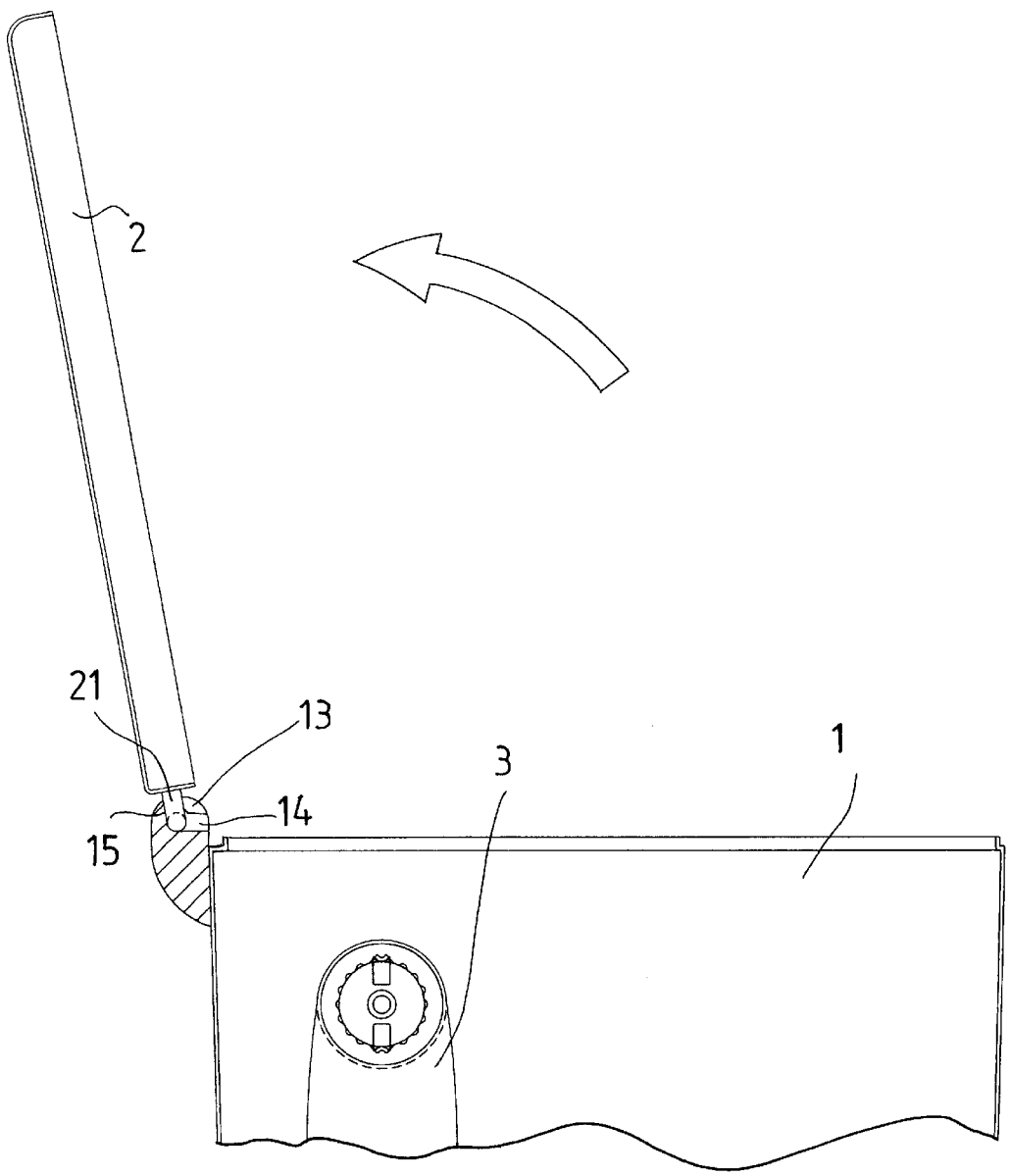
FIG. 9 is a partial side view of the present garbage can, in the opened position.
Figure 10:
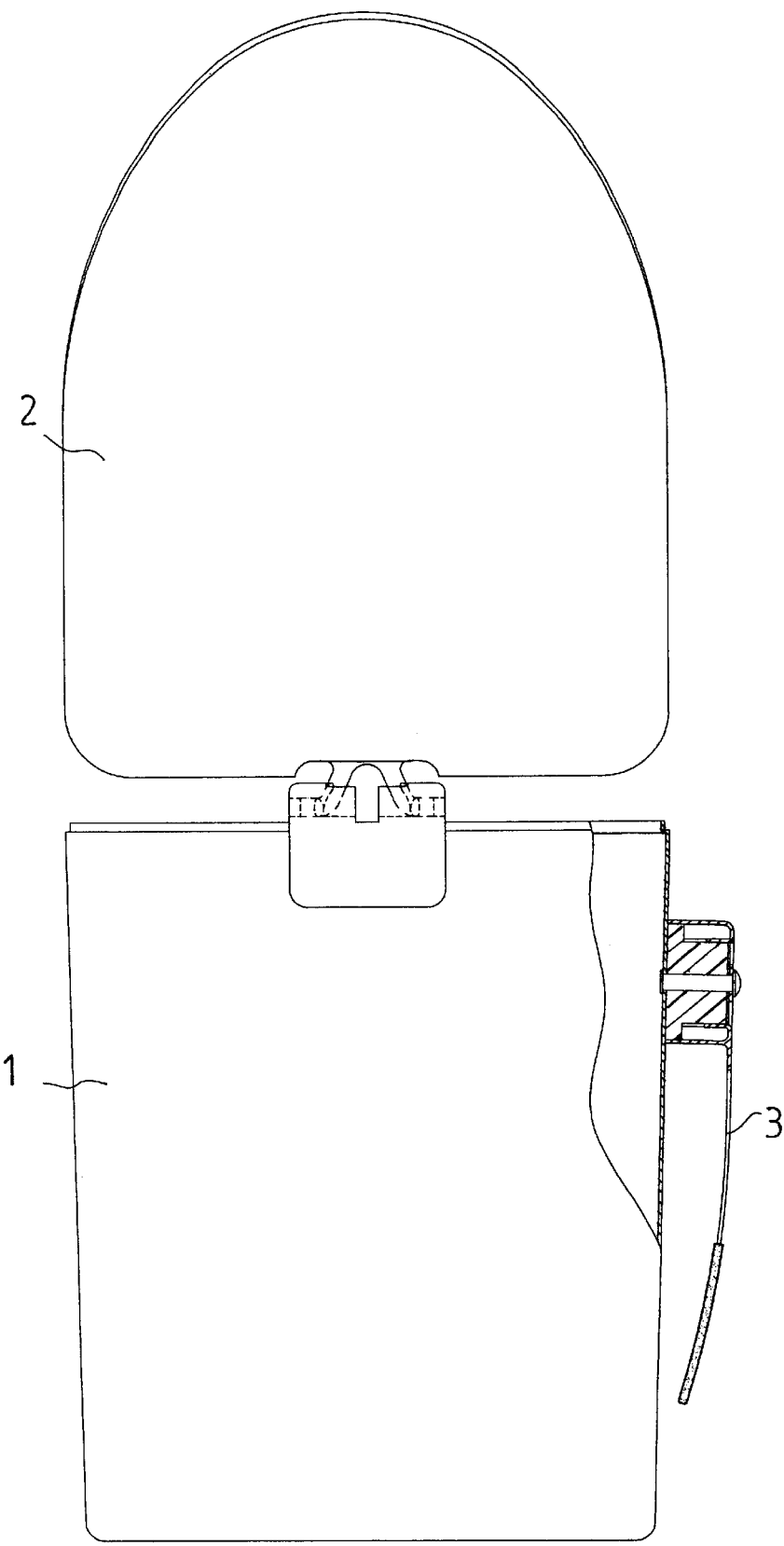
FIG. 10 is a rear view of the present garbage can, in the opened position.
Figure 11:
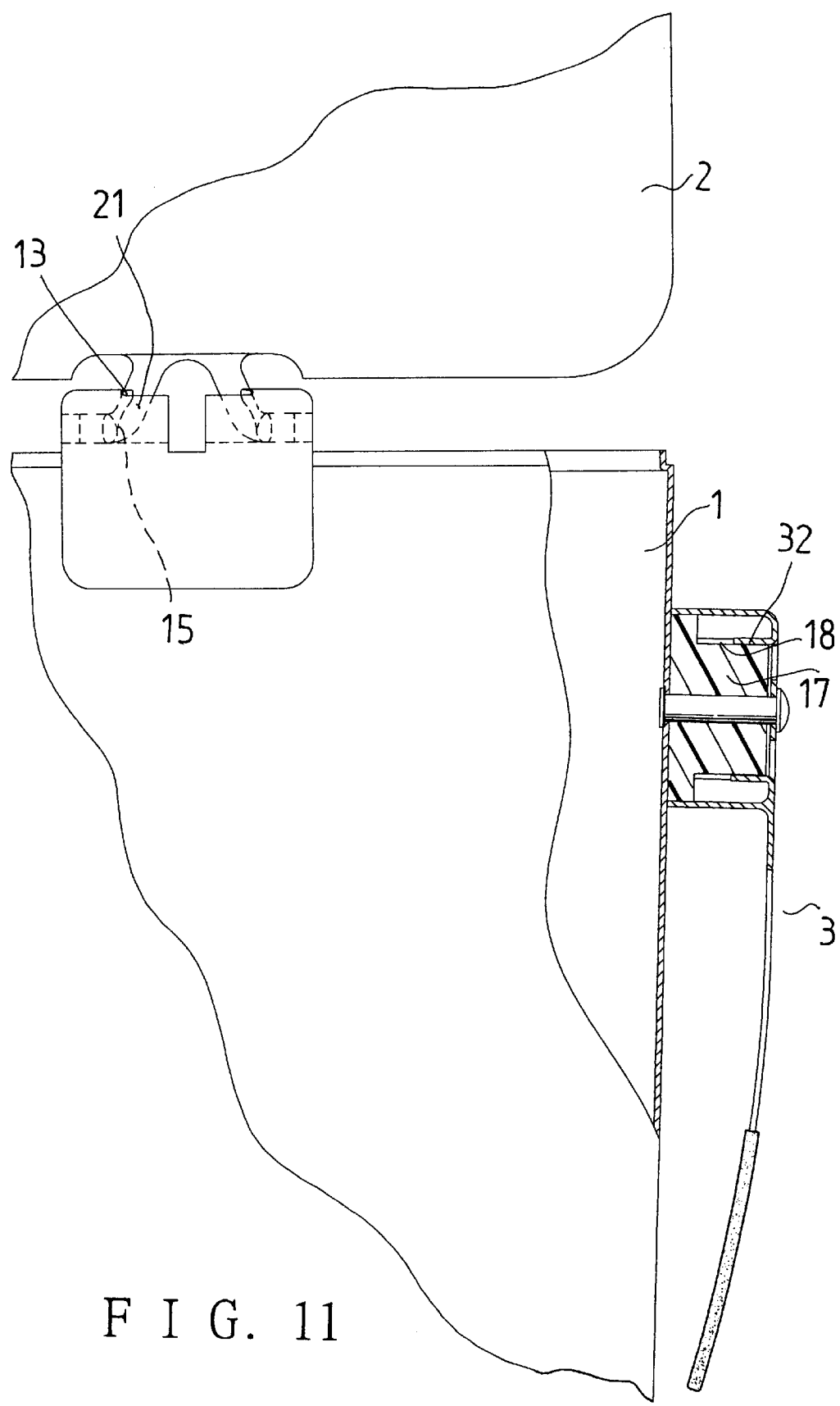
FIG. 11 is an enlarged detailed view of the garbage can FIG. 10.

The fastening plate 3 is inserted into narrow rooms between two adjacent parts inside a car, e.g. a space behind a shell of a support of the gearshift lever, as shown in FIG. 6; thus, the outer one of the adjacent parts is tightly sandwiched between the plate 3 and the containing body 1, and the present garbage can is secured in position in the car. In case the present garbage can is to be secured to an object inside a car that slopes on the upper edge as shown in FIG. 7, the fastening plate 3 is adjusted in position accordingly so that the garbage can still can be steadily held in the car in an upright position.

Figure 3:
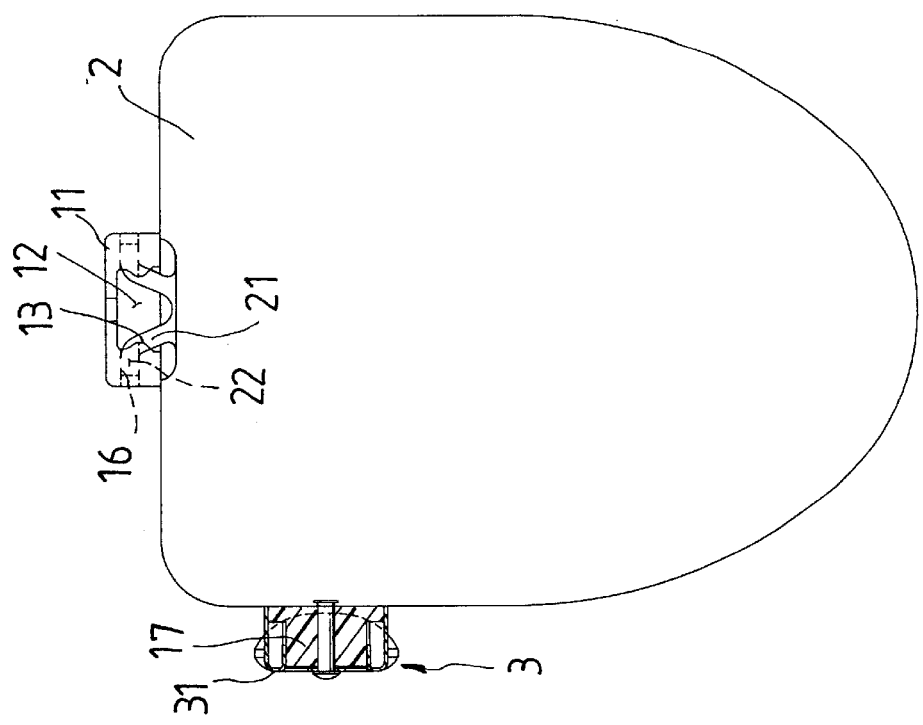
FIG. 3 is a top view of the garbage can according to the present invention.
Figure 2:
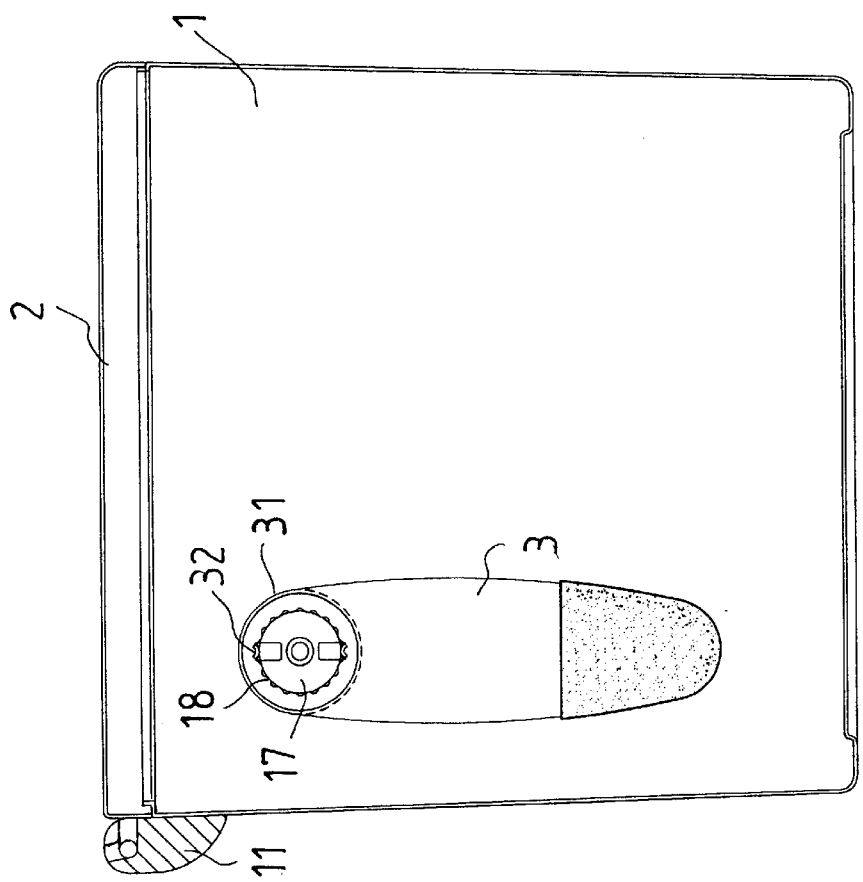
FIG. 2 is a side view of the wheel of the garbage can according to the present invention.

The front sections of the connecting rods 21 of the lid 2 are fitted in the front locating cavities 14 of the connecting portion 11 of the containing body 1, as shown in FIGS. 2, and 3, when the lid 2 is closed; thus, the lid 2 can't be accidentally opened when the car is moving. Because the connecting rods 21 are flexible and resilient, they can move past corresponding ones of the stopping convexities 13 when an upward force is exerted to pivot the lid 2 on the containing body 1; due to the resilience, the connecting rods 21 will snap into the rear locating cavities automatically, and the lid 2 will move to a substantially upright position as soon as the connecting rods 21 are moved past the stopping convexities 13. And, the front sections of the connecting rods 21 are fitted in the rear locating cavities 15 to keep the lid 2 in position until the user closes the lid 2.

From the above description, it can be easily understood that the garbage can of the present invention has advantages as followings:

1. It can be secured in position in a car with the fastening plate 3 thereof, and the plate 3 is adjustable for allowing the can to be secured to a stationary object inside a car that slopes on the upper edge. Consequently, the can won't fall over.

2. The lid 2 is secured in position with the connecting rods 21 being engaged with the front locating cavities 14 after it is closed therefore it can't be accidentally opened, preventing garbage from falling out of the can.

3. The lid 2 is secured in position with the connecting rods 21 being engaged with the rear locating cavities 15 after it is opened, allowing people to put garbage into the can easily.

What is claimed is:

1. A garbage can for use in an automobile, comprising a containing body having two apart opposing connecting projections on a rear edge of a top; each of the connecting projections having a pivotal hole extending horizontally from an inward end towards other end; each of the connecting projections having a stopping convexity on the inward end, and front and rear locating concavities respectively adjacent to front and rear edges of the stopping convexity thereof; and a lid having flexible and resilient connecting rods joined to a rear edge thereof; the connecting rods having front sections forming an angle in between, and horizontal rear sections inserted into corresponding ones of the pivotal holes for pivoting the lid to the containing body; when the lid is closed, the connecting rods engaging corresponding front locating concavities for keeping the lid keep in closed position; when the lid is moved to a substantially upright position, the connecting rods engaging corresponding rear locating concavities for keeping the lid in opened position.

2. The garbage can for use in an automobile as claimed in claim 1, wherein the containing body has a connecting projection on a lateral side, and a fastening plate is provided; the fastening plate having a circular member joined thereto, and being pivoted to the connecting projection with the circular member being fitted around the projection; the circular member having an engaging block on an inner side thereof, which separably engages concavely curved sections spaced around an outer side of the projection, thus making the fastening plate adjustable in orientation in relation to the containing body.

* * * * *